United States Patent Office 3,199,035
Patented Aug. 3, 1965

3,199,035
SYSTEM FOR SHIFTING PULSES OCCURRING AT ARBITRARY INSTANCES OF CLOCK PULSE CYCLES TO A FIXED INSTANT OF THE PULSE CYCLES
Hans Kok and Antonie Wijbe van't Slot, Hilversum, Netherlands, assignors to North American Philips Company, Inc., New York, N.Y., a corporation of Delaware
Filed Jan. 11, 1961, Ser. No. 82,095
Claims priority, application Netherlands, Jan. 21, 1960, 247,609
4 Claims. (Cl. 328—63)

This invention relates to an arrangement for shifting pulses, which occur at an arbitrary instant of clock pulse cycles, and which vary at the most by one quarter of the repetition period of the pulse cycles, to a fixed instant of the pulse cycles. The arrangement comprises a circuit having an input terminal connected to an input terminal of the arrangement as a whole, an output terminal connected to a starting terminal of a double pulse gate and a starting terminal connected to a control-terminal of the arrangement as a whole. The double pulse gate comprises, apart from the said starting terminal, an output terminal connected to an input terminal of a storing one-shot generator, a stop terminal connected to a control-terminal of the arrangement as a whole and two supply terminals connected to supply terminals of the arrangement as a whole. The setting terminal of the generator is connected to the input terminal of the arrangement as a whole and the output terminal thereof is connected to the setting terminal of a second storing one-shot generator, the second generator having an input terminal connected to a third supply terminal of the arrangement as a whole and an output terminal connected to the output terminal of the arrangement as a whole. The circuit is adapted to supply an output pulse at one of two instants of the pulse cycles differing from each other by half a pulse period, when after having been started by a unique starting pulse fed to its starting terminal the circuit arrangement received further pulses at its input terminal. The double pulse gate is arranged so that it permits the passage of either the pulses fed to one supply terminal or the pulses fed to its other supply terminal according as the circuit arrangement has fed a pulse to its starting terminal at one or the other of the aforesaid instants and so that it does not permit pulses to pass, when a pulse is applied to its stop terminal, the instants at which pulses are fed to its supply terminal occurring about one quarter period after the aforesaid instants.

Such an arrangement may be employed for forming telegraph signals into pulse code groups. The apparatus forming these pulse code groups may be simplified, when the pulses of these pulse code groups occur all at a fixed instant of a pulse cycle. If the pulse cycle contains, for example, 12 instants, they may be designated by $t_1, t_2 \ldots t_{12}$ and the order of succession of instants may be: $t_{10}, t_{11}, t_{12}, t_1, t_2, t_3, t_4, t_5, t_6, t_7, t_8, t_9, t_{10}, t_{11}, t_{12}, t_1, t_2, t_3 \ldots$ One embodiment of the invention will be described more fully with reference to the drawing.

Figure 1:
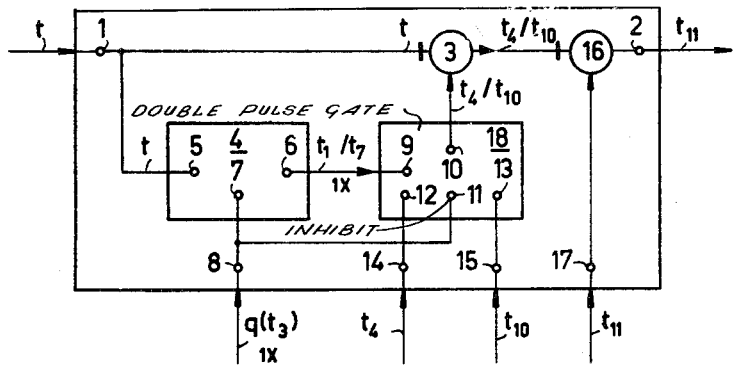
FIG. 1 shows a block diagram of the arrangement according to the invention.

FIG. 1 shows the block diagram of an arrangement according to the invention. In this figure reference numeral 1 designates the input terminal to which input pulses occurring at arbitrary instants are fed, 2 designates the output terminal which delivers these pulses at the fixed instant $t_{11}$ of the pulse cycles containing, in the embodiment shown, 12 instants. The input terminal 1 is connected to the setting terminal of a storing one-shot generator 3 and furthermore to the input terminal 5 of a circuit 4. A storing one-shot generator is to be understood to mean herein a circuit comprising at least three terminals, which are to be distinguished as a setting terminal, an input terminal and an output terminal. This circuit supplies an output pulse only when a pulse of given polarity and of adequate amplitude and duration is first fed to the setting terminal (the setting of the generator) and subsequently a pulse of given polarity and of adequate amplitude and duration is fed to the input terminal (firing of the generator). Once fired, a storing one-shot generator is therefore not capable of supplying an output pulse again unless it is reset. In other words, the firing of a storing one-shot generator which has not been previously set, has no effect. The generator may, if desired, have two or more setting terminals, the circuit being then arranged so that the generator is brought into the set condition by feeding a setting pulse to any of its setting terminals (non-coupled setting terminals) or as an alternative so that the generator can be brought into the set condition only by simultaneously applying a setting pulse to two or more of its setting terminals (coupled setting terminals which are set in coincidence). The generator may have two or more input terminals and be arranged so that after having been brought previously into the set condition it supplies an output pulse, when an input pulse is applied to any one of its input terminals.

The circuit 4 comprises apart from the aforesaid input terminal 5 an output terminal 6 and a starting terminal 7, which is connected to a control-terminal 8 of the arrangement as a whole. The circuit 4 is such that, when at an instant $t_3$ of a pulse cycle a single pulse $q$ is applied to its starting terminal 7, it responds to the reception of pulses applied to its input terminal 5 after the instant $t_3$ by emitting a pulse at the first instant $t_1$ or $t_7$ following the instant $t$ when the first of the pulses applied to the input terminal 5 occurred. If $t$ lies between the instant $t_1$ and the next following instant $t_7$, the circuit 4 supplies a pulse at the instant $t_7$. If, however, $t$ lies between the instant $t_7$ and the next following instant $t_1$, the circuit 4 supplies a pulse at the instant $t_1$. The circuit 4 remains insensitive to further input pulses applied to the terminal 5 until at an instant $t_3$ a single pulse $q$ is again received.

The output terminal 6 of the circuit 4 is connected to the starting terminal 9 of a double pulse gate with storage 18. This double pulse gate has, apart from the aforesaid starting terminal 9, an output terminal 10, a stop terminal 11 and two input terminals 12 and 13, each of which is connected to a supply terminal 14 and 15 respectively of the arrangement as a whole. Clock pulses are fed to the supply terminal 14 at the instant $t_4$ of the pulse cycles and to the supply terminal 15 at the instant $t_{10}$ of the pulse cycles. The double pulse gate is arranged so that it is closed, i.e. it does not permit the pulses applied to its input terminals 12 and 13 to pass to its output terminal 10, when at an instant $t_3$ a pulse is fed to its stop terminal 11, and the gate opened, when at an instant $t_1$ or $t_7$ a starting pulse is applied to its starting terminal 9. In the opened state the double pulse gate permits the passing, however, of either only the clock pulses applied to its input terminal 12 at the instant $t_4$ of the pulse cycles, or only the clock pulses applied to its input terminal 13 at the instant $t_{10}$ of the pulse cycles, depending upon whether it has started at an instant $t_1$ (output pulses at $t_4$) or at an instant $t_7$ (starting pulses at $t_{10}$).

The output terminal of the generator 3 is connected to the setting terminal of the storing one-short generator 16, of which the output terminal is connected to the output terminal 2 of the arrangement as a whole and of which the input terminal is connected to a supply terminal 17 of the arrangement, to which at the instant $t_{11}$ of the cycles are applied pulses.

The arrangement according to the invention shifts the pulses of sequentially received code groups to a fixed instant of the pulse cycles (in the embodiment shown the instant $t_{11}$) provided that the pulses of the incoming signal are at least substantially synchronized with the clock-pulse generator (i.e. when the pulse interval is approximately equal to the duration of the pulse cycles), but occur at an arbitrary instant of the pulse cycles, which instant may even vary slightly. Shifting of the instant of occurrence of the incoming pulses with respect to the pulse cycles generated by the local clock-pulse generator is termed "jittering." This phenomenon is produced inter alia by interferences in the transmission line or in the transmission medium and by an imperfect synchronism of the local clock-pulse generator with the clock-pulse generator of the transmitter which has transmitted the incoming signal.

Figure 2:
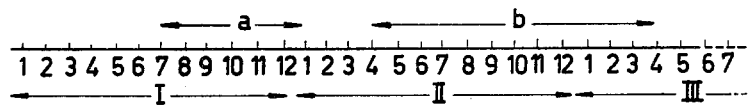
FIGS. 2 and 3 show each a diagram to explain the operation of the arrangement according to the invention.
Figure 3:
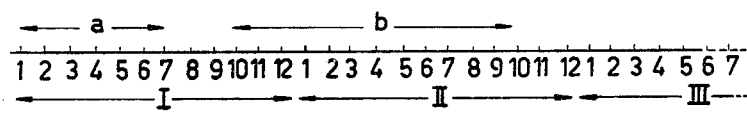

It is supposed that before receiving the first code element $a$ of the first pulse code group of a telegram, a pulse 9 is applied at an instant $t_3$ to the control-terminal 8. This pulse starts the circuit 4 and stops the circuit 13. Assume first that the first code element $a$, which is always a pulse, is received at the instant lying between the instant $t_7$ of the pulse cycle I and the instant $t_1$ of the next following pulse cycle II (FIG. 2). Then the circuit 4 supplies one pulse at the instant $t_1$ of the pulse cycle II. This pulse opens the double pulse gate 18, and the gate thus supplies pulses at the instant $t_4$ of the pulse cycles, firing the generator 3. The code element $a$ stored in the generator 3 at the instant $t$ lying between $t_7$ and $t_1$ of the pulse cycle I, is transferred to the generator 16 at the instant $t_4$ of the pulse cycle II and is emitted at the instant $t_{11}$ of the pulse cycle II. The second code element $b$ of the telegram must not arrive prior to the instant $t_4$ of the pulse cycle II (since then the generator 3 still contains the code element $a$) and it must not arrive after the instant $t_4$ of the pulse cycle III (since then the generator 3 is fired and must be free to store the third code element $c$). In an unfavourable case the code element $a$ may arrive immediately before the instant $t_1$ of the pulse cycle II; without any "jitter" the code element $b$ would then arrive immediately before the instant $t_1$ of the pulse cycle III. From FIG. 2 it is evident that in this case for the code element $b$ (and for all subsequent code elements) a delay of three phases of the pulse cycles and an advance of nine phases of the pulse cycles are permissible. The other unfavourable case occurs when the code element $a$ arrives immediately after the instant $t_7$ of the pulse cycle I. In this case an advance of three phases of the pulse cycles and a delay of nine phases of the pulse cycles are permissible. FIG. 3 shows a similar diagram for the case in which the code element $a$ arrives in between the instants $t_1$ and $t_7$ of the pulse cycle I. In all cases advances and delays of less than three phases of the pulse cycles (one quarter of a period of the pulse cycles) are always permissible, even in those cases in which the code element $a$ arrives just at an instant $t_1$ or $t_7$, in spite of the fact that it is then uncertain whether the diagram of FIG. 2 or that of FIG 3 applies.

Figure 4:
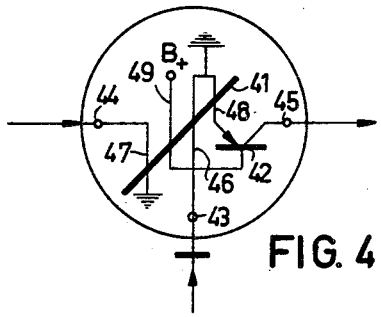
FIG. 4 shows the circuit diagram of a component part used in the embodiment shown in FIG. 1.

The invention is independent of the kind of the storing one-shot generators employed. A very practical embodiment of these pulse amplifiers is described by S. S. Gutermann and W. M. Carey, Jr., in Convention Record I.R.E. 3 No. 4, London 1955, pages 84–94 (A transistor magnetic core circuit; A new device applied to digital computing techniques). FIG. 4 shows the circuit arrangement of this generator inside the symbol used thereto. In this figure 41 designates an annular core of a material having a rectangular magnetic hysteresis loop, 42 designates a pnp-transistor, 43 the setting terminal, 44 the input terminal, 45 the output terminal, 46 a setting winding connected to the setting terminal, 47 an input winding connected to the input terminal, 48 a feed-back winding connected via the emitter-collector path of the transistor 42 to the output terminal and 49 a control-winding connected on the one hand to a low positive voltage source $B_+$ and on the other hand to the base of the transistor 42. The senses of winding of the various windings are evident from the manner in which the lines indicating these windings intersect the thick line segment which represents the annular core 41. Each winding is indicated in the drawing by a wire threaded only once through the core 41, but in practice each winding may comprise more than one turn. A possible dimensioning of the pulse amplifier is described in copending patent application Serial No. 819,076, filed June 9, 1959, now Patent No. 3,079,589.

The generator of FIG. 4 operates as follows: it is assumed that the generator is in the non-set state (core 41 in the state "0". By feeding a current pulse of given polarity and of adequate amplitude and duration to the setting terminal 43, the generator arrives into the set state (core 41 in state "1". The voltage induced into the control-winding 49 by the changeover of the core 41 from state "0" to state "1" renders the base of the transistor 42 further positive than it already was so that the transistor 42 remains cut off. If then a pulse is fed to the input terminal 44, the core 41 starts changing over and the voltage thus induced into the control-winding 49 overcomes the voltage supplied by the voltage source $B_+$. The base of the transistor 42 thus becomes negative and the transistor becomes conductive, i.e. the output 45 supplies a current pulse. The current then flowing through the feed-back winding 48 drives the core 41 also the state "0", so that this current is capable of taking over the function of the input pulse. Even when the input pulse has already terminated before the core 41 has reached the state "0", this core will continue moving towards the state "0" until this condition is reached, since the function of the input pulse is completely taken over by the current which is passed by the transistor 42 through the feed-back winding 48. As soon as the core 41 has reached the state "0," no voltage is any longer induced into the control-winding 49, so that the base of the transistor 42 again becomes positive and the transistor 42 no longer supplies current to the output terminal 45. The effect is therefore such that upon firing, the generator supplies an output pulse and thus arrives into the non-set state. By suitable proportioning this output pulse may have within certain limits a sharply defined amplitude and duration. The input pulse need not meet other requirements than that it should drive the core 41 sufficiently far on the steep part of its hysteresis loop to induce a voltage into the control-winding 49, which is capable of overcoming the voltage of the voltage source $B_+$ and hence of rendering negative the voltage at the base of the transistor 42. The setting pulse must, of course, be sufficiently strong for the core 41 to be moved completely into the condition 1. It can furthermore be easily assessed that firing of a previously fired but subsequently not reset generator has no effect. It is furthermore evident that the generator may comprise two or more input terminals connected each to a separate input winding. The generator can then be fired by supplying an input pulse to any of its input terminals. The generator may furthermore have two or more setting terminals, each of which is connected to a separate setting winding. The numbers of turns of these setting windings may be chosen that the generator is brought to the set state, when a setting pulse is fed to any of its setting terminals (non-coupled setting terminals) but also so that the generator is brought to the set state only when a setting pulse is fed to two of its setting terminals (coupled setting terminals; setting in coincidence).

Figure 5:
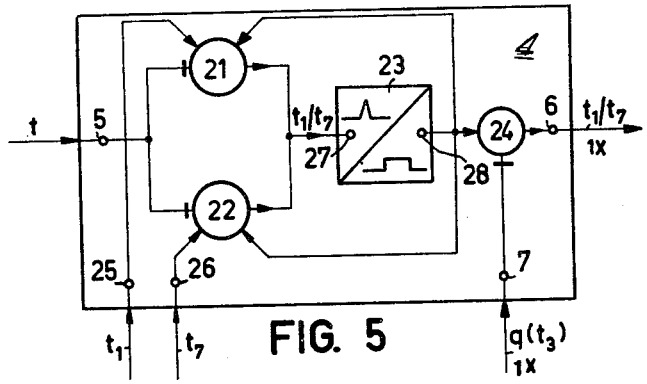
FIGS. 5 and 6 show each one embodiment of a detail of the arrangement shown in FIG. 1.

FIG. 5 shows one example of a circuit diagram for the circuit 4. In this circuit, as disclosed in copending application Serial No. 82,096, filed January 11, 1961, reference numeral 5 designates the input terminal, 6 the output terminal, 7 the starting terminal and 25 and 26 designate two supply terminals, to which clock pulses are fed at the instants $t_1$ and $t_7$ of the pulse cycles. The input terminal 5 is connected to the setting terminals of two starting one-shot generators 21 and 22. The supply terminal 25 is connected to a input terminal of the generator 21 and the supply terminal 26 is connected to an input terminal of the generator 22. The output terminals of the generators 21 and 22 are connected to the input terminal 27 of a blocking oscillator 23, of which the output terminal 28 is connected to the input terminal of a storing one-shot generator 24 and moreover to a second input terminal of each of the generators 21 and 22. The setting terminal of the generator 24 is connected to the starting terminal 7 and the output terminal of this generator is connected to the output terminal 6 of the arrangement as a whole.

The circuit operates as follows. It is supposed that at the instant $t_3$ of a pulse cycle the circuit is started by applying a pulse $q$ to the starting terminal 7. Thus the generator 24 is set. It is furthermore supposed that the circuit receives subsequently a pulse sequence at the input terminal 5, of which sequence the first pulse is received at an instant $t$ lying between the instants $t_1$ and $t_7$ of a pulse cycle. At the instant $t$ the generators 21 and 22 are both set by the said pulse. At the instant $t_7$ following the instant $t$ the pulse amplifier 22 is fired and it supplies an output pulse which excites the blocking oscillator 23. This supplies an output pulse which fires the generator 24 and, moreover, the generators 21 and 22. The output pulse supplied by the generator 24 at the instant $t_7$ is, the output pulse of the arrangement as a whole. The pulse produced by firing the pulse generator 21 is added to the pulse produced by the generator 22 at the same instant, but this has no effect on the action of the blocking oscillator 23. The firing pulse fed to the generator 22 has no effect since this generator had just received a firing pulse via the supply terminal 26. In any case the generators 21 and 22 are left in the unset state and are hence prepared for the reception of the next incoming pulse. The circuit is then however no longer capable of supplying output pulses, since the generator 24 has been fired, in other words, it supplies one pulse at the instant $t_7$, which follows immediately the instant $t$. The same occurs, when $t$ lies between $t_7$ and $t_1$.

Figure 6:
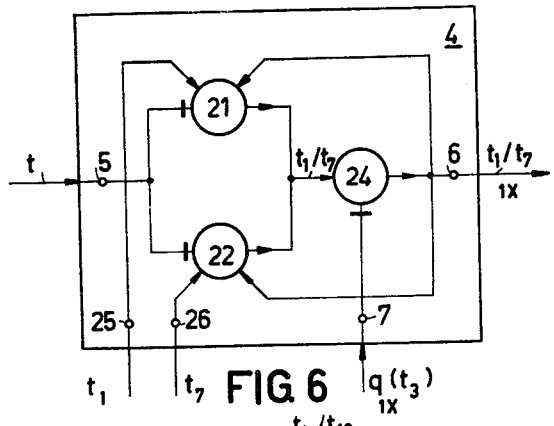

FIG. 6 shows an arrangement which differs from that of FIG. 5 by the omission of the blocking oscillator. Otherwise the operation of this arrangement is identical to that of FIG. 5.

Figure 7:
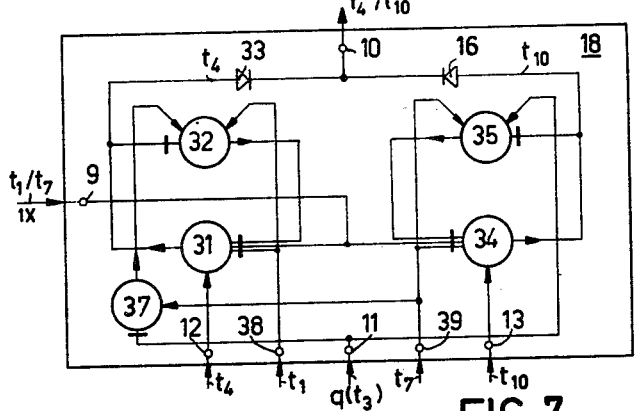
FIG. 7 shows the circuit diagram of a further detail of the arrangement shown in FIG. 1.

FIG. 7 shows a circuit for the double pulse gate 18. This gate comprises mainly two pulse gates. The first gate consists storing one shot generators 31 and 32 and the second of storing one shot generators 34 and 35. The first pulse gate can be opened by a pulse at an instant $t_1$ and be closed by a pulse at an instant $t_7$. In the open state it permits pulses of the cycles occurring at the instant $t_4$ to pass. The second pulse gate can be opened by a pulse at an instant $t_7$ and be closed by a pulse at an instant $t_3$. In the opened state this gate permits pulses occuring at the instant $t_{10}$ of the cycles to pass.

The first pulse gate comprises the two generators 31 and 32. The generator 31 has three coupled setting terminals, of which one is connected to the output terminal of the generator 32 a second is connected to the starting terminel 9 of the double pulse gate 18 and the third is connected to a supply terminal 38 of the double pulse gate 18 and to an input terminal of the generator 32. The generator 31 is furthermore constructed so that it can be brought into the set condition only by feeding a setting pulse simultaneously to at least two of its three coupled setting terminals. If a setting pulse is applied to only one of its three setting terminals this pulse does not set the generator. The output terminal of the generator 31 is connected to the single setting terminal of the generator 32 and via a decoupling diode 33 to the output terminal 10 of the double pulse gate 18. The generator 31 thus supplies the output pulses of the pulse gate 31, 32. The input terminal of the generator 31 is connected to the input terminal 12 of the double pulse gate 18. Finally the pulse gate comprises a further storing one-shot generator 37, of which the setting terminal is connected to the stop terminal 11 of the double pulse gate 18, the input terminal to a supply terminal 39 of the double pulse gate 18 and the output terminal to a second input terminal of the generator 32. At the instants $t_1$, $t_4$, $t_7$ and $t_{10}$ of the pulse cycles clock pulses are fed to the terminals 38, 12, 39 and 13 respectively of the double pulse gate.

The pulse gate 31–32 operates as follows. It is supposed that the generators 31 and 32 are both in the non-set condition. Since then none of the two generators is capable of supplying output pulses, neither of the two generators can be brought into the set condition by the clock pulses fed to the terminals 38 and 12. For the generator 32 this is evident without further explanation, for the generator 31 this applies, since no coincidence occurs at its three coupled setting terminals. This condition is therefore stable and the generator 31 does not supply output pulses (i.e., the pulse gate is closed). It will be evident hereinafter that the pulse gate is brought into this condition by a stop pulse $q$ at the instant $t_3$ of the pulse cycles.

If at an instant $t_7$ a pulse is fed to the starting terminal 9, this pulse does not bring the generator 31 into the set condition, since at this instant no coincidence occurs at the setting terminals of this generator. The pulse gate 31, 32 therefore does not respond to pulses occuring at this instant.

However, if at an instant $t_1$ a pulse is fed to the starting terminal 9, the generator 31 is set owing to the coincidence of this pulse with the clock pulse fed to the supply terminal 38. At the subsequent instant $t_4$ the generator 31 is fired and the pulse gate supplies an output pulse. Moreover, the generator 32 is set. At the next following instant $t_7$ the generator 32 is fired and the pulse supplied by this generator sets the generator 31 in coincidence with the clock pulse fed to the supply terminal 38. This process continues repeating. The pulse gate is then open and permits the clock pulses fed to the input terminal 12 at the instant $t_4$ of the pulse cycles to pass.

If at an instant $t_3$ one pulse $q$ is fed to the stop terminal 11, the generator 37 is set but at the subsequent instant $t_7$ it is fired. The pulse thus supplied by the generator 31 fires the pulse amplifier 32 (which is in the set condition at the instant $t_7$). The output pulse then supplied by the generator 32 does not bring the generator 31 (which is in the non-set condition at the instant $t_7$) into the set condition, since no coincidence occurs at its coupled setting terminals. The two generators 31 and 32 are thus in the non-set condition, in other words, the pulse gate 31–32 is closed.

The pulse gate 34, 35 is built up in the same manner and operates similarly to the pulse gate 31, 32. Since the pulse gate 34, 35 can be closed at an instant $t_3$, this pulse gate need not comprise generators corresponding with the generator 37. The last-mentioned generator in the pulse gate 31, 32 has no other function than shifting the pulse $q$ occurring at an instant $t_3$ to an instant (in this case the instant $t_7$) when this pulse gate can be closed (i.e. an instant when the generator 32 is in the set condition).

What is claimed is:

1. A system for shifting pulses to a predetermined position with respect to a clock pulse cycle, said system comprising a source of input pulses, a source of clock pulses for providing pulse cycles of a predetermined number of sequential clock pulses, each pulse cycle comprising first and second pulse instants one-half cycle apart, third and fourth pulse instants lagging said first and second instants, a fifth pulse instant subsequent said fourth instant, and a stop pulse instant, first and second storing one-shot generators having first and second input terminals, respectively, first and second setting terminals, respectively, and first and second output terminals, respectively, means providing a gating pulse connected to said clock pulse source and having a third input terminal and a third output terminal, double gate means connected to said clock pulse source and having a starting terminal and a fourth output terminal, means applying said input pulses to said first setting terminal and said third input terminal, means connecting said first output terminal to said second setting terminal, means connecting said third output terminal to said starting terminal, means connecting said fourth output terminal to said first input terminal, means connecting said second input terminal to said clock pulse source whereby pulses are applied to said second input terminal at said fifth instants, and output circuit means connected to said second output terminal, said gating pulse providing means providing a gating pulse at its output terminal at the next of said first and second instants following an input pulse and subsequent the occurrence of a stop pulse instant, with only one gating pulse following any stop pulse instant, said double gate means providing an output pulse at said third and fourth instants following the occurrence of a gating pulse at said first and second instants, respectively.

2. A system for shifting pulses to a predetermined position with respect to a clock pulse cycle, said system comprising a source of input pulses, a source of clock pulses providing pulse cycles of first, second, third, fourth, fifth and sixth sequential pulses, first and second storing one-shot generators having first and second input terminals, first and second output terminals, and first and second setting terminals, respectively, means for generating gating pulses having a third input terminal and a third output terminal, double gate means having a starting terminal connected to said third output terminal and an output terminal connected to said first input terminal, means applying said input pulses to said first setting terminal and said third input terminal, means connecting said first output terminal to said second setting terminal, output circuit means connected to said second output terminal, means applying said sixth pulse to said second input terminal, means applying said first, second and fourth pulses to said means for generating gating pulses, and means for applying said second, third and fifth pulses to said double gate means, said means for generating gating pulses providing a gating pulse at its output terminal at the time of the next of said first and fourth pulses following an input pulse and subsequent the occurrence of a second pulse, with only one gating pulse following any second pulse, said double gate means providing an output pulse at its output terminal at the instants of said third and fifth pulses following the occurrence of a gating pulse at the time of said first and fourth pulses, respectively.

3. The system of claim 2, in which said first and fourth pulses are one-half pulse cycle apart, said third and fifth pulses lag said first and fourth pulses respectively by one-quarter pulse cycle.

4. The system of claim 2, in which said double gate means comprises first and second gates for passing said third and fifth pulses, respectively, comprising means for opening said first and second gates upon the occurrence of a gating pulse at the time of said first and fourth pulses, respectively, means for closing said first gate at the time of said fourth pulse, and means for closing said second gate at the time of said second pulse.

References Cited by the Examiner
UNITED STATES PATENTS 2,529,666 11/50 Sands _____ 328—48
2,973,509 2/61 Majerus et al. _____ 328—61

JOHN W. HUCKERT, *Primary Examiner.*

ARTHUR GAUSS, *Examiner.*

UNITED STATES PATENT OFFICE
CERTIFICATE OF CORRECTION

Patent No. 3,199,035                       August 3, 1965

Hans Kok et al.

It is hereby certified that error appears in the above numbered patent requiring correction and that the said Letters Patent should read as corrected below.

Column 3, line 59, strike out "in", second occurrence; column 4, line 22, for "state "0"." read -- state "0"). --; line 25, for "state "1"." read -- state "1"). --; line 35, before "45" insert -- terminal --; same column 4, line 72, after "chosen" insert -- so --; column 5, line 11, for "starting" read -- storing --; line 71, for "terminel" read -- terminal --; column 6, line 40, for "$t_7$" read -- $t_1$ --; line 56, for "pulse amplifier" read -- generator --.

Signed and sealed this 12th day of July 1966.

(SEAL)
Attest:

ERNEST W. SWIDER                       EDWARD J. BRENNER
Attesting Officer                            Commissioner of Patents